United States Patent

Povinger et al.

[11] Patent Number: 5,474,054
[45] Date of Patent: Dec. 12, 1995

[54] FUEL INJECTION CONTROL SYSTEM WITH COMPENSATION FOR PRESSURE AND TEMPERATURE EFFECTS ON INJECTOR PERFORMANCE

[75] Inventors: Bela P. Povinger, Grosse Ile; Raymond L. Willey, Redford, both of Mich.

[73] Assignee: Ford Motor Company, Dearborn, Mich.

[21] Appl. No.: 172,782

[22] Filed: Dec. 27, 1993

[51] Int. Cl.[6] ............................................. F02D 41/14
[52] U.S. Cl. ....................................... 123/689; 123/486
[58] Field of Search ........................... 123/689, 480, 123/486, 494, 527

[56] References Cited

U.S. PATENT DOCUMENTS

| | | | |
|---|---|---|---|
| 4,430,978 | 2/1984 | Lewis et al. | 123/527 |
| 4,643,153 | 2/1987 | Clement et al. | 123/486 |
| 4,696,275 | 9/1987 | Kushi et al. | 123/480 |
| 4,753,204 | 6/1988 | Kojima et al. | 123/689 |

*Primary Examiner*—Andrew M. Dolinar
*Attorney, Agent, or Firm*—Allan J. Lippa; Roger L. May

[57] ABSTRACT

A fuel injection control system suitable for use with internal combustion vehicle engines fueled by compressed natural gas or the like. A conventional liquid-fuel closed-loop injection timing controller establishes the duration of each injection command signal by the combination of a P.I.D. controller responsive to the level of exhaust oxygen, an adaptive table which stores previously determined fuel delivery rate values for particular engine speed and load conditions, an injector supply voltage table which stores fuel delivery rate correction values which compensate for variations in injector operating potentials, and a two-dimensional correction table which provides correction values to compensate for variations due to fuel pressure and resistance variations in the injector actuators due to temperature variations.

3 Claims, 1 Drawing Sheet

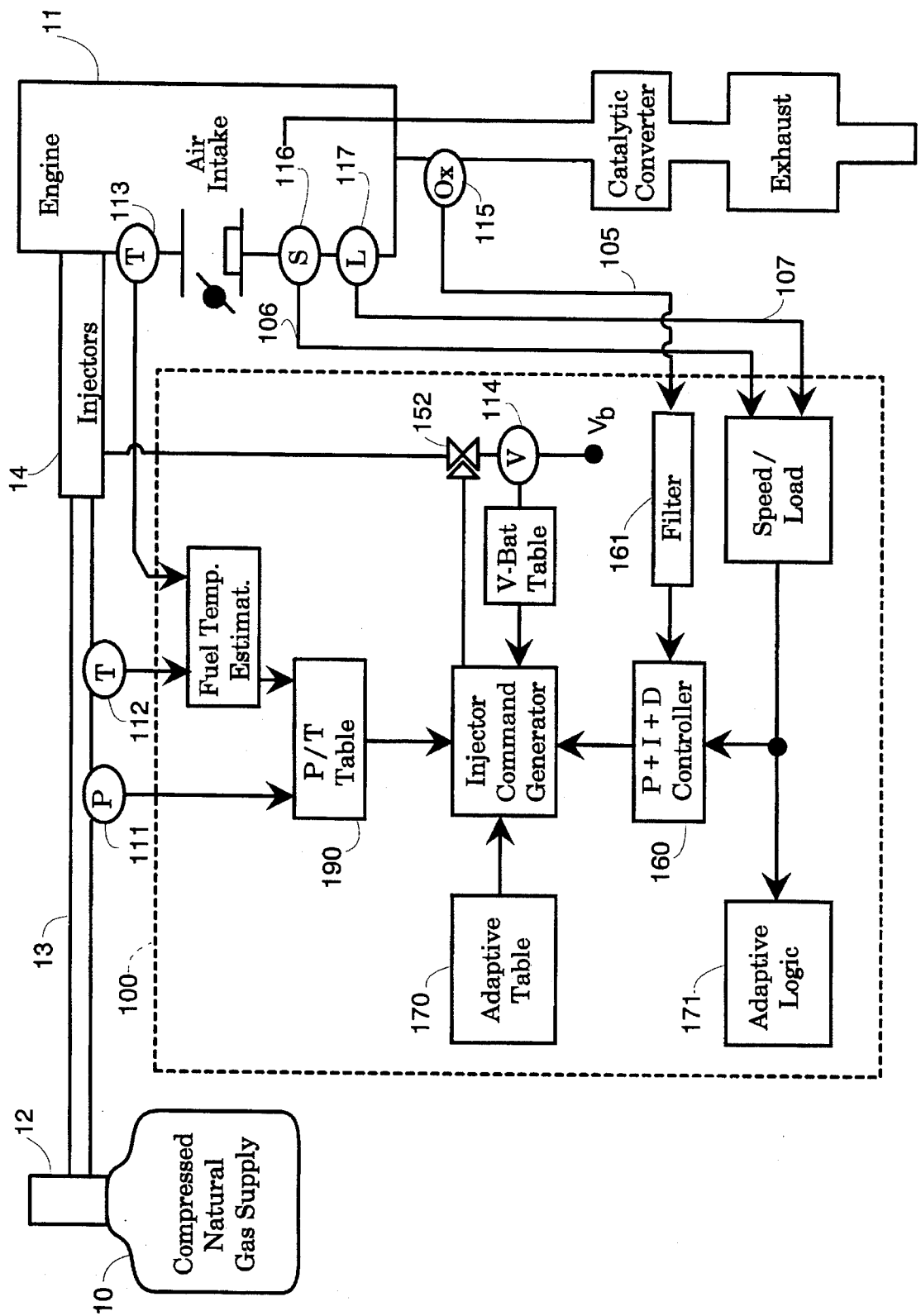

FUEL INJECTION CONTROL SYSTEM WITH COMPENSATION FOR PRESSURE AND TEMPERATURE EFFECTS ON INJECTOR PERFORMANCE

FIELD OF THE INVENTION

This invention relates generally to methods and apparatus for controlling the delivery of fuel to an internal combustion engine, and more particularly to optimizing the amount of fuel delivered in the presence of fuel pressure and injector temperature changes.

BACKGROUND OF THE INVENTION

Electronic fuel control systems are increasingly being used in internal combustion engines to precisely meter the amount of fuel required for varying engine requirements. Such systems vary the amount of fuel delivered for combustion in response to multiple system inputs including throttle angle and the concentration of oxygen in the exhaust gas produced by combustion of air and fuel. Typical electronic fuel control systems operate in a closed-loop mode in response to sensed exhaust oxygen level in order to maintain the ratio of air and fuel at or near stoichiometry. Improved forms of fuel control systems include an adaptive mechanism which learns and remembers the probable amount of fuel that needs to be injected under previously experienced engine operating conditions which can later be identified by the values of such sensed variables such as engine speed, engine load, engine coolant temperature and fuel type.

The speed at which the electrically actuated fuel injectors can respond to a given control signal, and hence the amount of fuel injected in response to that signal, has been found to be influenced by the battery voltage level available to the injector actuators. Accordingly, conventional liquid fuel injection systems of the type used with engines fueled by gasoline, methanol, and ethanol have employed processing means for altering the duration of the fuel injection command signals to compensate for the effects of battery voltage on fuel delivery.

The fuel control systems designed for use in liquid-fueled vehicles have proven to have significant shortcomings when used to supply compressed gases, such as natural gas, rather than gasoline and other liquid fuels.

First, while liquid-fuel pressure regulators are typically capable of delivering fuel at a substantially constant pressure, typically about 40 p.s.i.g., over a wide range of operating conditions, regulators used with compressed natural gas supplied at higher pressure, typically around 100 p.s.i.g., cannot maintain constant pressure over the wide range of operating temperatures and flow rates to which the engine is subjected.

Secondly, variations in ambient temperature at the injectors change the resistance exhibited by the actuating solenoids, and that resistance change in turn alters the time required for the injectors to respond to actuating signals, resulting in substantial variation in the amount of fuel delivered by the injectors.

SUMMARY OF THE INVENTION

In accordance with the present invention, it has been found advantageous to augment the capabilities of the electronic fuel injection control system by altering the duration of the fuel injection command signals by first selecting a predetermined correction value from a set of such values pre-stored in a lookup table device, the selected value being identified in accordance with both the current fuel pressure and current injector temperature.

The control system contemplated by the invention includes a conventional closed-loop controller which is responsive to the sensed level of oxygen in the combustion gases generated by the engine as measured by an exhaust gas oxygen level sensor. This sensor produces a rich indication when the oxygen level is low and a lean indication when the oxygen level is high. The closed-loop controller responds to each lean indication by progressively increasing the fuel delivery rate until a rich exhaust level indication is obtained. Correspondingly, the system responds to a rich indication by progressively decreasing the fuel delivery rate until a lean indication reappears. The controller adjusts the fuel delivery rate by varying the duration of time during which the fuel injectors are open during each cycle. In accordance with the present invention, the duration of each injector command signal is adjusted by a correction value which is selected from a lookup table consisting of a set of predetermined values, the particular correction value being selected in joint response to the currently sensed values of fuel pressure and ambient injector temperature.

In accordance with the invention, the correction value used to adjust the injector command signal duration additively supplements a further correction value which compensates for variations in flow rate resulting from changes in the supply voltage supplied to actuate the injectors.

By applying the principles of the present invention, the repeatability and reliability of the injector system over a wide range of operating conditions is significantly improved. The invention allows an otherwise conventional liquid fuel control system to be adapted to meet the more stringent requirements imposed by compressed gas fuels, particularly when the fuel delivery system is operated under markedly different conditions.

These and other features and advantages of the present invention may be better understood by considering the following detailed description of a preferred embodiment of the invention. In the course of this description, reference will frequently be made to the attached drawings.

BRIEF DESCRIPTION OF THE DRAWINGS

FIG. 1, the single FIGURE of the drawings, is a schematic block diagram of an internal combustion engine and an electronic engine control system which embodies the invention.

DETAILED DESCRIPTION

FIG. 1 of the drawings shows a fuel control system adapted to use the principles of the invention. A tank 10 containing compressed natural gas supplies fuel to an engine 11 via a pressure regulator 12 and a supply conduit 13 to conventional fuel injectors 14 or the type used with vehicles operated on liquid fuels (gasoline, ethanol, methanol, or a mixture thereof). A closed-loop fuel controller 100 responds to signal inputs indicated at 101–107 in FIG. 1. Signal input 101 provides a fuel pressure value obtained from a fuel pressure sensor 111 in communication with the fuel supply conduit 13. Signal input 102 provides a fuel rail temperature value from a temperature sensor 112 in the fuel supply conduit 13. Sensor 112 is preferably located on the fuel rail near the injectors 14 so that the value supplied by signal 102 may be combined at 120 with the input signal 103 which is connected to an engine coolant temperature sensor 113, forming a control signal at output 121 whose value represents the estimated operating temperature within the injectors 14. Input signal 105 is obtained from a heated exhaust gas oxygen (HEGO) sensor 115 which is positioned to sense the gases exhausted from engine 11. Input signals 106 and 107 indicate engine speed and engine load respectively. The engine speed signal 106 is typically obtained by determining the pulse rate from a crankshaft tachometer 116 while the engine load value provided by signal 107 is derived from an intake manifold pressure and other readings collectively represented for purposes of illustration by a sensor 117 seen in FIG. 1.

The controller 100 develops a command signal, indicated at 150 in FIG. 1, which controls an electronic switch 152 which supplies an operating potential from a voltage source 154 to open and close the injectors 14. The duration of each command signal 150 determines the amount of fuel delivered to the engine. That duration is determined by an injector command signal generator seen at 172 which generates an injector command signal having a duration which varies in response to four different inputs: the output of a closed-loop proportional/integral/differential (PID) controller 160 and the output from each of three tables 170, 180 and 190. Each of these tables contains a set of predetermined values from which a particular value is selected to vary the command signal duration based on current engine operating conditions.

The operation of the PID controller 160 is conventional and provides the principle closed-loop control mechanism for establishing the fuel delivery rate. The oxygen level signal 105 from the HEGO sensor is supplied to the PID controller 160 via a low-pass filter 161 which removes high-frequency components from the oxygen level signal. When the oxygen level signal supplied via filter 161 to the controller 160 falls below a predetermined level, indicating a rich condition, the controller's proportional component produces a stepwise decrease in the duration of the injector signal, and then begins to gradually and progressively decrease the command signal duration, thus gradually reducing the fuel delivered to the engine until the combustion products reaching the HEGO sensor produce a high oxygen level, indicating a lean condition, whereupon the controller abruptly increases the duration of the command signal and begins to gradually and progressively increase the command signal duration using its integral component, causing an increasing amount of fuel to be supplied until the HEGO sensor again detects a rich condition. The cycles continue in this fashion, with the mixture being held at or near stoichiometry as desired. Additional information on the use of such closed-loop control mechanisms is presented by D. R. Hamburg and M. A. Schulman in SAE Paper 800826.

The first of the three correction tables, the adaptive value table seen at 170 is conventional and provides the fuel control system with the ability to adaptively learn (and thereafter predict) approximately what the fuel delivery rate should be to achieve stoichiometry at a given engine speed and load. When the engine has achieved a stable operation point and the PID controller 160 has determined a rate of fuel delivery which is at or near stoichiometry, an adaptive logic unit 171 stores the fuel delivery rate (which takes the form of an injector command duration value) in the adaptive table 170. The adaptive table 170 enables acceptable fuel delivery rates to be adaptively learned and stored, and later fetched when engine operating conditions change abruptly, permitting the learned value to be used as a estimate which the closed loop mechanism provided by the PID controller 160 can then refine to achieve stoichiometric operation more rapidly.

The second of the lookup tables is seen at 180. This second table, which is also conventional, senses the voltage level supplied from the voltage source 154 to operate the injectors, and corrects the duration of the command signal to compensate for the fact that the injector response time is a predictable function of the injector operating potential. The correction value from table 180 takes the form of a duration value (which may be expressed in milliseconds) which directly adjusts the injector command signal to compensate for the effects of injector supply voltage variations.

The combination of the PID controller 160 and the adaptive and battery voltage lookup table functions have proven to function reliably and accurately for liquid fueled engines. However, when an attempt is made to instead supply the engine with fuel which takes the form of a compressed gas, the fuel control system does not provide repeatably reliable operation. These problems have two principle causes: (1) the pressure regulator 12 is typically unable to accurately control the pressure of the compressed gas supplied to the injector as the engine temperature and flow rates change and (2) the effects of temperature on the operating resistance of the injector actuators alters the response time of the injectors sufficiently to cause substantial changes in the fuel delivery rate of the compressed gas fuel. The deleterious impact of both of these problems is greatly reduced, and satisfactory operation achieved, by storing an additional set of values for correcting the injector command signal in the two-dimensional lookup table 190 which is indexed in one dimension by the fuel pressure value 101 and in the other dimension by the injector temperature estimate value 121.

The engine control module 100 is preferably implemented by an available integrated circuit microcontroller and memory devices operating under stored program control. Suitable microcontrollers are available from a variety of sources and include the members of the Motorola 6800 family of devices which are described in detail in Motorola's Microcontroller and Microprocessor Families, Volume 1 (1988), published by Motorola, Inc., Microcontroller Division, Oak Hill, Tex.

The injection command signal 150 is synchronized with the rotation of the engine crankshaft, and hence with piston and valve movements, by processing event signals from one or more sensors (as illustrated by the tachometer 116 in FIG. 1) which are applied to the microcontroller as interrupt signals. These signals are typically applied to the microprocessor's interrupt terminal (not shown) to execute interrupt handling routines which perform time-critical operations under the control of variables stored in memory. By accumulating these interrupt signals, numerical values indicative of crankshaft rotation can be made available to the adaptive fuel control system.

Analog signal values from sensors, such as the temperature sensors 112 and 113, the pressure sensor 111, and the HEGO sensor 115, may be connected to the controller to provide information in the form of analog voltage level signals which are then converted to digital form for processing by means of analog-to-digital (A–D) converters built into the microcontroller. The adaptive table 170, because it is both read and updated, preferably takes the form of a non-volatile "keep alive memory" (KAM), whereas the pressure/temperature command signal time correction lookup table 190 contemplated by the present invention, as well as the injector voltage correction table 180, may take the form of values determined empirically for a particular vehicle and permanently stored in a read-only memory (ROM), along with other engine configuration parameters.

In practice, it has been found that a 5×5 table (indexed by five discrete fuel pressure values and five discrete injector temperature values) provides adequate command signal time correction accuracy and substantially improves the reliability of the fuel control system.

It is to be understood that the specific mechanisms and techniques which have been described are merely illustrative of an application of the principles of the invention. Numerous modifications may be made to the methods and apparatus described without departing from the true spirit and scope of the invention.

What is claimed is:

1. A method for injecting fuel into an internal combustion engine, said method comprising, in combination, the steps of:

providing said engine with a plurality of fuel injectors, each of said injectors including an electromechanical mechanism for receiving fuel under pressure via a fuel supply system and for injecting a measured amount of fuel into said engine in response to a command signal whose duration is indicative of the amount of fuel to be injected, said electromechanical mechanism having a speed of operation which varies with the temperature of said mechanism, measuring the oxygen content of the gases exhausted by said engine to form an oxygen level signal;

varying the duration of said command signal in response to said oxygen level signal by increasing said duration whenever said oxygen level signal is greater than a first threshold value and decreasing said duration whenever said oxygen level is less than a second threshold value;

measuring the pressure of said fuel in said fuel supply conduit to form a fuel pressure signal;

measuring at least one temperature value in the vicinity of at least one of said fuel injectors to form an injector temperature signal;

determining the magnitude of a plurality of correction values associated with a corresponding plurality of different fuel pressure and injector temperature operating conditions, each of said correction values being indicative of the extent to which each of said plurality of operating conditions varies the speed of operation of said electromechanical mechanism thereby affecting the desired duration of said command signal;

storing said correction values in a storage device;

periodically retrieving a selected one of said values in accordance with the then-current values of said fuel pressure signal and said injector temperature signal; and varying the duration of said command signal in accordance with each of said selected values.

2. The method set forth in claim 1 wherein each of said electromechanical mechanisms is powered by a voltage source and controlled by said command signal, and wherein said method further comprises, in combination, the steps of:

measuring the magnitude of the voltage delivered to said mechanism by said voltage source, and varying the duration of said command signal in response to variations in the magnitude of said voltage to compensate for variations in the speed of operation of said mechanism.

3. The method set forth in claim 1 wherein said fuel takes the form of a pressurized gas.

\* \* \* \* \*